(12) United States Patent
Tsymbulov et al.

(10) Patent No.: US 11,441,207 B2
(45) Date of Patent: Sep. 13, 2022

(54) METHOD OF CONTINUOUSLY PROCESSING NICKEL-CONTAINING COPPER SULPHIDE MATERIALS

(71) Applicant: Publichnoe Aktsionernoe Obschestvo "Gorno-Metallurgicheskaya Kompaniya Norilsky Nikel'", Dudinka (RU)

(72) Inventors: Leonid Borisovich Tsymbulov, St. Petersburg (RU); Mihail Viktorovich Knyazev, St. Petersburg (RU); Viktor Mihailovich Tozik, Norilsk (RU); Sergei Petrovich Pigarev, St. Petersburg (RU); Vladimir Borisovich Fomichev, Norilsk (RU); Vladimir Ilich Lazarev, Norilsk (RU); Sergei Yurevich Eroshevich, Norilsk (RU); Viktor Aleksandrovich Ivanov, Norilsk (RU)

(73) Assignee: Publichnoe Aktsionernoe Obschestvo "Gorno-Metallurgicheskaya Kompaniya Norilsky Nikel'", Dudinka (RU)

( * ) Notice: Subject to any disclaimer, the term of this patent is extended or adjusted under 35 U.S.C. 154(b) by 534 days.

(21) Appl. No.: 16/090,524

(22) PCT Filed: Sep. 26, 2016

(86) PCT No.: PCT/RU2016/000642
§ 371 (c)(1),
(2) Date: Oct. 1, 2018

(87) PCT Pub. No.: WO2017/171581
PCT Pub. Date: Oct. 5, 2017

(65) Prior Publication Data
US 2019/0119783 A1   Apr. 25, 2019

(30) Foreign Application Priority Data

Apr. 1, 2016 (RU) .......................... RU2015146716

(51) Int. Cl.
*C22B 15/00* (2006.01)
*C22B 23/02* (2006.01)
*C22B 7/04* (2006.01)

(52) U.S. Cl.
CPC ............ *C22B 15/0052* (2013.01); *C22B 7/04* (2013.01); *C22B 15/003* (2013.01);
(Continued)

(58) Field of Classification Search
CPC . C22B 15/0052; C22B 15/003; C22B 15/005; C22B 15/0054; C22B 23/02; C22B 7/04
See application file for complete search history.

(56) References Cited

U.S. PATENT DOCUMENTS

| 4,802,916 A | 2/1989 | Victorovich et al. |
| 5,449,395 A * | 9/1995 | George ................. C22B 15/003 266/217 |
| 6,270,554 B1 * | 8/2001 | Queneau et al. ... C22B 15/0097 266/177 |

FOREIGN PATENT DOCUMENTS

| CA | 1225527 A | 8/1987 |
| GB | 2099457 A | 12/1982 |

(Continued)

*Primary Examiner* — Anthony J Zimmer
*Assistant Examiner* — Dean Mazzola
(74) *Attorney, Agent, or Firm* — Hoffmann & Baron, LLP

(57) ABSTRACT

A method of continuously processing nickel-containing copper sulphide materials into blister copper, waste slag, and copper-nickel alloy includes oxidizing smelting along with SiO2 and CaO-containing fluxes and coal in a conversion furnace for conversion to produce blister copper, gases with concentration of $SO_2$, and slag with an SiO2:CaO concentration ratio of 0.4:1 to 3:1, in which the sum of the iron, (Continued)

nickel, and cobalt is not more than 30 wt. %, at a specific oxygen consumption in the range of 150-240 Nm$^3$ per ton of dry sulphide material, and depleting the slag in a separate reduction furnace, using a mixture of an oxygen-containing gas and a hydrocarbon fuel at an oxygen consumption coefficient ($\alpha$) in a range of 0.5 to 0.9, while supplying coal in an amount of up to 15% of weight of the slag produced by the oxidizing smelting, to produce a waste slag and a copper-nickel alloy.

2 Claims, 4 Drawing Sheets

(52) U.S. Cl.
CPC ........ *C22B 15/005* (2013.01); *C22B 15/0054* (2013.01); *C22B 23/02* (2013.01)

(56) References Cited

FOREIGN PATENT DOCUMENTS

| | | | |
|---|---|---|---|
| RU | 2169202 C1 | | 6/2001 |
| RU | 2359046 C1 | * | 6/2009 |
| RU | 2359046 C1 | | 6/2009 |

* cited by examiner

METHOD OF CONTINUOUSLY PROCESSING NICKEL-CONTAINING COPPER SULPHIDE MATERIALS

CROSS-REFERENCE TO RELATED APPLICATIONS

This application claims is the U.S. National Phase of International Application No. PCT/RU2016/000642, filed on Sep. 26, 2016, which claims benefit of Russian Patent Application No. 2015146716, filed on Apr. 1, 2016, both of which are incorporated herein in their entirety.

BACKGROUND

Field

The present invention relates to a field of non-ferrous metallurgy, and in particular to a method of continuously processing nickel-containing copper sulphide materials.

The method can be used for continuously processing nickel-containing copper sulphide materials to produce a blister copper, a waste slag, and a copper-nickel alloy.

Related Art

There is a known method of continuously converting liquid and solid sulphide materials (Russian Patent No. RU 2071982), which comprises feeding sulphide materials in a furnace, supplying an oxygen-containing blast into a layer of matte-metal-slag emulsion through horizontal blowing devices disposed evenly in sidewalls of the furnace, and removing liquid products of the conversion from the furnace. The disadvantage of aforesaid method is a possibility of periodic formation of an intermediate matte layer between the layers of slag and copper. Presence of the intermediate matte layer inevitably causes formation of semi-blister copper instead of blister copper. As a periodic production of semi-blister copper is allowed, the given technology of continuous conversion should in this case also prescribe a required operation of final conversion. The disadvantages of this conversion method are the formation of folded nickel slags and inexpediency of sulphur utilization at final conversion. In the case of producing semi-blister copper in the furnace, instead of blister copper, it follows that a disadvantage of this technology is a low direct copper recovery to blister copper because an operation of depleting the slag formed during oxidizing smelting is not prescribed by this method.

There is also known a method of converting copper concentrate to a blister copper (Russian Patent No. RU 2169202), comprising charge feeding, melt scavenging with formation of the slag and blister copper, and releasing of the smelting products. Oxidizing smelting of the copper concentrate is carried out at ratio of loaded concentrate and oxygen-containing gas feed in a range of 1.0-1.3, theoretically required to oxidize a whole of sulphur and impurities (Fe, Ni, Co) to oxides, and before releasing the slag, which is performed periodically, the slag depleting is conducted with change in the ratio of loaded concentrate and oxygen-containing gas feed to 0.3-1.0 of that theoretically required in order to oxidize the whole of sulphur and impurities (Fe, Ni, Co) to oxides, thereby achieving decrease of copper oxide content in the slag from 35% to 22%. The disadvantage of this blister copper production method is that a rather high content of copper remains in the slag after the depletion process. This is because iron, cobalt, and nickel are transferred from the copper concentrate to the slag via exchange reactions during the reduction of the slag by a sulphide concentrate, resulting in substantial increase of iron and nickel concentrations in the slag in view of a decreasing copper concentration. Concentrations of iron and nickel in the slag increase even more when attempting to reduce copper in the slag more deeply, and the sedimentation of solid nickel-iron spinel occurs as a result of homogeneous silicate melt saturation. The significant amount of solid spinel present in the slag results, as is known, in the unavoidable slag foaming and creation of an emergency.

A combination of the two processes (oxidative and reductive) in one furnace space causes a non-constant composition of the smelting products (copper, slag, and waste gases), and makes it rather complicated to control such technology automatically.

Non-constant levels of slag and copper imply a periodic contact of the molten slag, which is aggressive due to a high content of copper oxide (i.e., the copper concentration reaches 35 wt. % at the oxidation stage), with a refractory lining, with the resulting rapid wear of the latter.

The closest method to the proposed invention, based on technical and technological essence of the invention, is a method of continuously processing copper- and nickel-containing sulphide materials with $SiO_2$ and CaO-containing fluxes (Russian Patent No. RU 2359046, incorporated herein by reference in its entirety) for production of blister copper, process slag, and gases with a high concentration of $SO_2$ in a furnace with two zones—oxidizing smelting is carried out in an oxidizing zone of a furnace, while slag depletion is carried out continuously in a reduction zone of the furnace using a mixture of oxygen-containing gas and hydrocarbon fuel at the oxygen consumption coefficient ($\alpha$) in a range of 0.5 to 0.9. During the stage of oxidizing smelting, CaO-containing flux is added along with $SiO_2$-containing flux to obtain a slag with $SiO_2$:CaO ratio from 3:1 to 1:1, and a total flux consumption for oxidizing smelting is determined in order to maintain a sum of iron, nickel, and cobalt concentrations in the slag that is not more than 30 wt. %. At the stage of slag reduction, a solid fuel, for instance coal, is added along with the hydrocarbon fuel. This method has a significant disadvantage as follows: the slag of the oxidizing smelting, without undertaking any changes to conditional properties of the blister copper according to nickel content, cannot be deeply reduced because the active nickel and iron recovery from the slag at a certain period of time in the process, followed with their transfer to the blister copper, make the blister copper substandard for further flame refining. Accordingly, the slag obtained from the two-zone Vanuykov furnace contains plenty of copper and nickel oxides (more than 11% and more than 6% respectively), making the resulting slag a rich product, which needs to be processed at an additional stage of recovery of copper and nickel. The processing of this slag causes additional burden on the pyrometallurgical nickel-producing circuit, where the slag is directed to additional copper and nickel recovery. This method is considered the closest analogue.

SUMMARY

An object of the invention is the development of a method of continuously processing nickel-containing copper sulphide materials to produce blister copper, slag having a composition corresponding to that of spoil standards, i.e., waste slag, and copper-nickel alloy. In order to achieve the intended purpose, conversion and recovery processes must be separated to separate units, namely, two single-zone Vanyukov furnaces connected via an overflow chute.

A method of continuously processing nickel-containing copper sulphide materials is represented as a complex, which includes two single-zone furnaces, for instance two Vanyukov furnaces. Oxidizing smelting of a nickel-containing copper sulphide material is carried out in a first conversion furnace, namely, a Vanyukov conversion furnace, along with $SiO_2$ and CaO-containing fluxes to produce blister copper, gases with a high concentration of $SO_2$, and slag enriched with copper and nickel oxides, the slag continuously entering through the overflow chute to a second reduction furnace of the complex, namely into a Vanyukov reduction furnace, where the slag is treated with a reduction gas mixture of an oxygen-containing gas and a hydrocarbon fuel at an oxygen consumption coefficient ($\alpha$) in a range of 0.5 to 0.9, and coal, producing the waste slag and the copper-nickel alloy. Besides nickel-containing copper sulphide material, copper-containing and/or nickel-containing by-products are added into the conversion and reduction furnaces. The oxygen consumption coefficient as disclosed in RU 2359046 is $\alpha = V_{O_2} \cdot \% \ O_2 + V_{air} \cdot 0.21 / Q_{CxHy} \cdot K_{CxHy}$, wherein $V_{O_2}$ is an oxygen consumption in the reduction furnace, $Nm^3/hr.$, % $O_2$ is a volume fraction of oxygen in the oxygen-containing gas, $V_{air}$ is an airflow to a recovery zone of the reduction furnace, $Nm^3/hr.$, $Q_{CxHy}$ is a consumption of the hydrocarbon fuel, $Nm^3/hr.$, and $K_{CxHy}$ is a coefficient characterizing complete combustion of the hydrocarbon fuel.

The main products of the continuous processing complex including the two separate Vanyukov furnaces are blister copper, gases with the high concentration of $SO_2$, waste slag and copper-nickel alloy. The chemical composition of waste slag allows its use in building industry or for stowing of mines, and the composition of copper-nickel alloy is a basis for producing commercial products.

Accordingly, a technical result is the production of blister copper, waste slag, and copper-nickel alloy by the continuous method, wherein conversion and recovery processes are separated into separate units, namely two single-zone Vanyukov furnaces.

In contrast to the closest analogue, the technical result of the proposed method is achieved, in part, due to the fact that the slag depletion is conducted in a separate unit, namely a Vanyukov reduction furnace, thus permitting production a waste slag and a copper-nickel alloy.

The method can be characterized in that the copper-nickel alloy, being a basis for producing commercial products, is produced during the depletion of molten slag.

The method can also be characterized by scavenging the molten slag within 17-35 mins. from the start of depleting the slag, in order to produce the waste slag and the copper-nickel alloy.

Moreover, the method can be characterized in that CaO-containing flux is added along with $SiO_2$-containing flux during the oxidizing smelting to produce a slag with $SiO_2$:CaO concentrations ratio from 0.4:1 to 3:1.

In addition, the method can be characterized in that the reduction is supplied with coal in an amount of up to 15% of the weight of the slag obtained at the oxidation stage.

The method can also be characterized in that by-products containing copper and/or nickel can be supplied to the conversion and/or reduction furnaces according to the claimed method.

BRIEF DESCRIPTION OF THE DRAWINGS

The preferred embodiments of the present invention, as well as other objects, features, and advantages of this invention, will be apparent from the accompanying drawings wherein.

DETAILED DESCRIPTION

Figure 1:
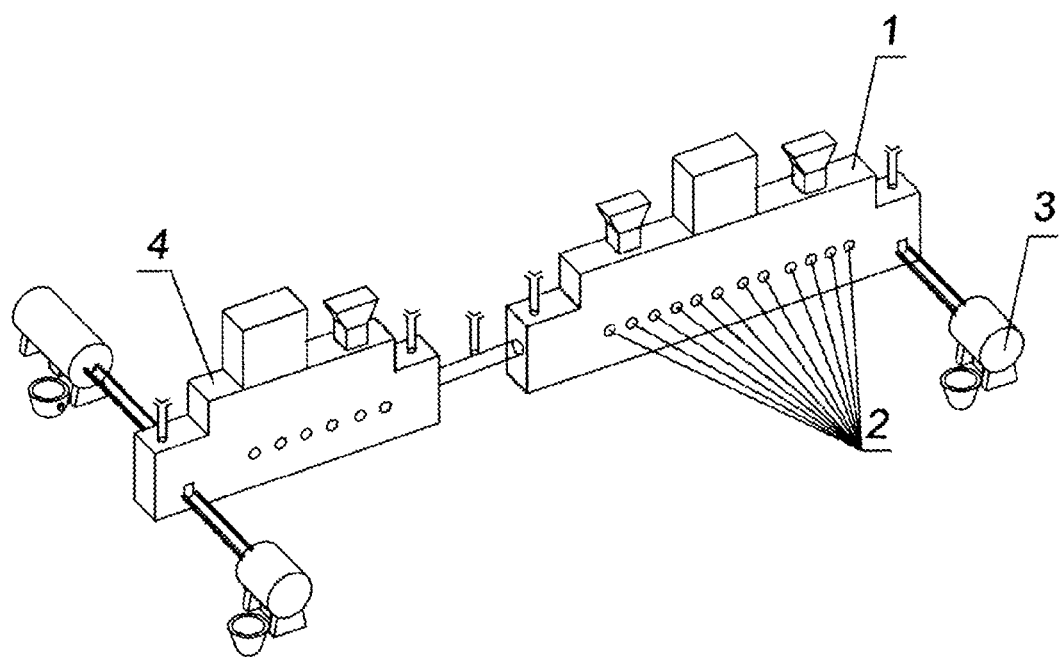
FIG. 1 is a side perspective view of two single-zone Vanyukov furnaces that are used in the present invention.

The claimed method of continuously processing nickel-containing copper sulphide materials in a continuous processing complex comprising two separate furnaces, namely two Vanyukov furnaces, is illustrated in FIG. 1. Nickel-containing copper sulphide materials are added along with $SiO_2$ and CaO-containing fluxes to a Vanyukov conversion furnace 1 of the continuous processing complex. An oxygen-air mixture and a gaseous fuel are added to Vanyukov furnace 1 through furnace tuyeres 2. Blister copper formed during the smelting process in a first furnace of the continuous processing complex, namely Vanyukov conversion furnace 1, is continuously released into a mixer 3, and a slag with a high content of copper, nickel, and iron passes to a second furnace of the continuous processing complex, namely to Vanuykov reduction furnace 4, where the slag is depleted by reduction gas-air mixture along with coal to produce a waste slag and a copper-nickel alloy. The reduction gas-air mixture is formed as a result of natural gas combustion in an oxygen-air mixture under oxygen shortage conditions. A temperature of the oxidation and reduction processes is maintained at a level of 1350° C.

Smelting products of the conversion furnace 1 (blister copper) and of the reduction furnace 4 (waste slag and copper-nickel alloy) are assumed to be released continuously. To release the smelting products, siphon-type devices (not shown in the drawings), located at the opposite ends of furnaces 1 and 4, are provided. Continuity of the proposed process in a form of a continuous processing complex comprising two Vanyukov furnaces 1 and 4 paves the way for maintaining constant levels of the slag and the blister copper in the Vanyukov conversion furnace 1, and waste slag and the copper-nickel alloy in the Vanyukov reduction furnace 4, which is an important advantage of this process. Blister copper is continuously released through a siphon-type device into the mixer 3 designed for it, and is then sent to anodic refining to produce copper anodes. A specific of the slag composition resulting from the oxidizing stage of the new method is that the slag contains copper and nickel in a ratio of 4:1-5:1, which is favorable for producing valuable copper-nickel alloy, for instance a 'Melchior' alloy. Copper-nickel alloy with some iron, which is a basis for producing commercial products, is produced as a result of deep reduction of the aforementioned slag to spoil standards. This copper-nickel alloy can be converted in pyrometallurgical nickel production, or directed to a stage of oxidizing refining in order to remove the iron and produce commercial products, the composition of which is determined for Russia by the State standard ('melchior' alloy, 'neusilber', etc.).

An important feature of the developed processing method is the fact that, in a case of converting materials containing precious, platinum group metals in the Vanyukov conversion furnace 1, these metals are almost completely recovered to blister copper and are not transferred to the slag, which is then fed to the Vanyukov reduction furnace 4 for depletion by reduction. This provides a production of copper-nickel alloy that is almost free from precious, platinum group metals in the Vanyukov reduction furnace 4.

It is obvious that it is more preferable to supply the copper-nickel alloy of the Vanyukov reduction furnace 4 to a customer as a commercial product after refining and casting operations.

Slag produced in the Vanyukov reduction furnace 4 is the waste slag. The chemical composition allows the waste slag to be used in the building industry or for the stowing of mines.

All sulphur contained in nickel-containing copper sulphide materials passes to a gaseous phase of the Vanuykov conversion furnace 1.

Since the oxidation stage of the continuous conversion process, conducted in the Vanuykov conversion furnace with production of blister copper has passed extensive studies and currently is sufficiently investigated (Tsymbulov L. B., Knyazev M. V., Tsemekhman L, Sh. A method for processing copper sulphide materials to blister copper //The patent of the Russian Federation Russian Patent No. 2359046 of Sep. 1, 2008. Pigarev S. P. Structure and features of slag melts of the continuously converting nickel-containing copper sulphide materials. Abstract of PhD dissertation St-Petersburg. 2013. 21 p.), the proposed invention is based on data of experimental studies of the reduction stage of the new processing method, coupled with a search for conditions resulting in the production of a waste slag and a copper-nickel alloy, which is a basis for producing commercial products, for instance 'Melchior' alloy, which is widely used nowadays in industries as the alloy with high anticorrosion properties, and also for producing household products and jewelry.

The methodology of the experimental studies was as follows. Into a laboratory furnace there were placed an alundum reactor having inside an alundum crucible, which contained an initial slag, namely an oxidative stage slag, with a following composition, wt. %: Cu—17.9; Ni—5.6; Fe—23.1; Co—0.135; $SiO_2$—27.5; CaO—11.9; $Al_2O_3$—3.1; and MgO—0.79. The furnace was then run, changing voltage of an inductor, and was heated to an operating temperature of 1350° C.

After the smelting of the slag, a melt was scavenged via a beryllium oxide tube with a reduction gas mixture of the following composition, vol %: CO—44; $CO_2$—38; $H_2$—18. Partial pressure of the oxygen in the reduction gas mixture corresponded to partial pressure of the oxygen in a mixture produced during natural gas combustion at the 'alpha' value ($\alpha$)=0.6.

In laboratory experiments, duration of melt scavenging using the gas mixture was varied from 0 to 50 mins. A flow rate of the gas mixture was 0.8 l/min After completion of scavenging, the melt was allowed to settle for 15 minutes, and the furnace was then turned off. Thereafter, the crucible with the melt was removed out of the furnace and cooled, and the slag was separated from the metal alloy.

After appropriate sample preparation, the slag and the metal alloy were analyzed by methods of atomic absorption spectrometry and inductively coupled plasma atomic emission spectrometry.

The chemical compositions of the metal alloy and the slag, produced as a result of the conducted experimental studies, are presented hereinbelow in TABLE 1.

At first, we consider changes in the slag composition according to copper and nickel content, when changing a time of scavenging the molten slag using the reduction gas mixture. This dependency is presented in FIG. 2.

Figure 2:
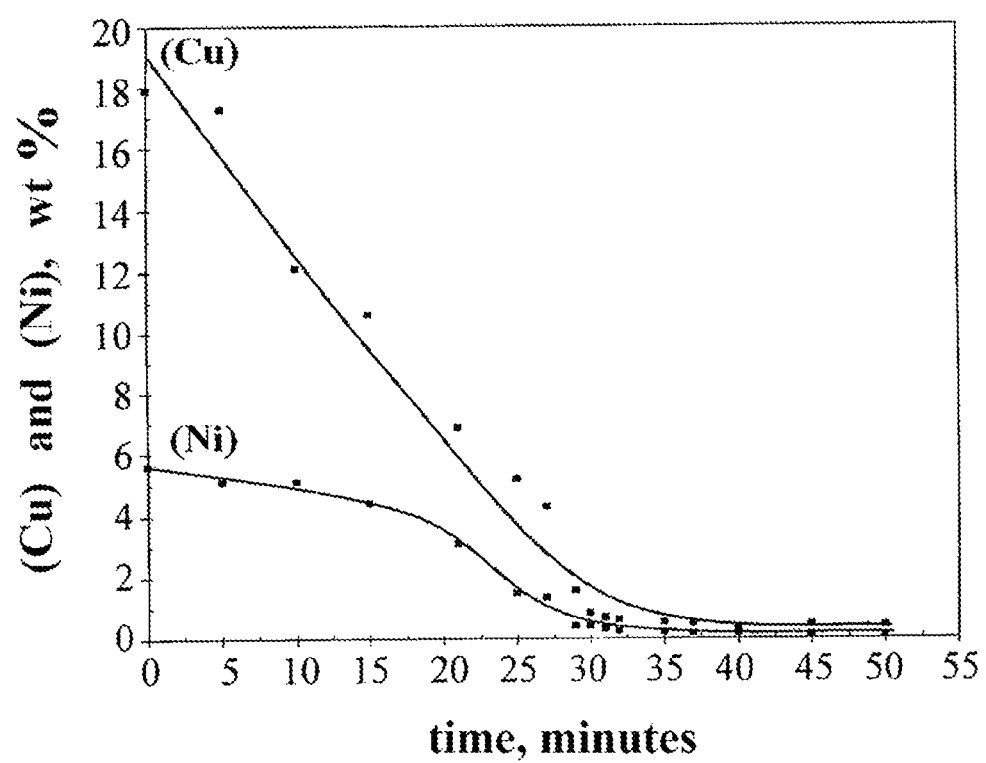
FIG. 2 is a graph illustrating the changes in composition of the slag over time with respect to the copper and nickel contents during the reduction stage.

As illustrated in FIG. 2, with the increase of time of scavenging the molten slag using the reduction gas mixture, there is a sharp decrease in copper content in the molten slag, and starting from the $17^{th}$ minute of scavenging, there is also a substantial decrease in nickel content in the molten slag in view of the decreasing copper content. After the $35^{th}$ minute of scavenging the molten slag, the decrease in copper and nickel concentrations in the slag becomes extremely insignificant.

Figure 3A:
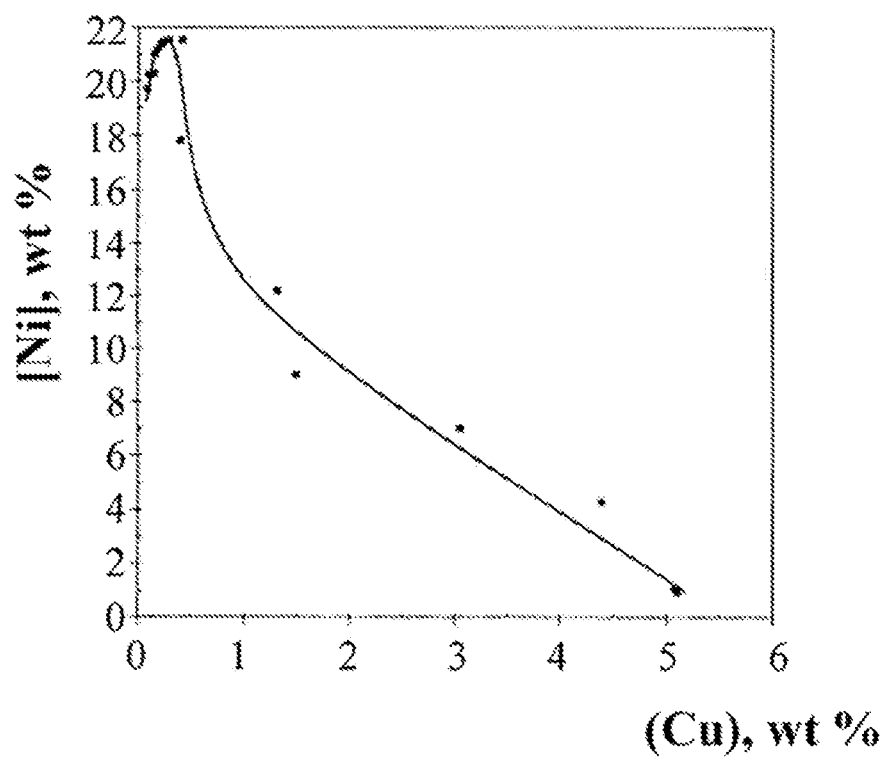
FIGS. 3A and 3B are graphs illustrating the changes in contents of copper and nickel in the slag with respect to increase in a content of nickel in the copper-nickel alloy.
Figure 3B:
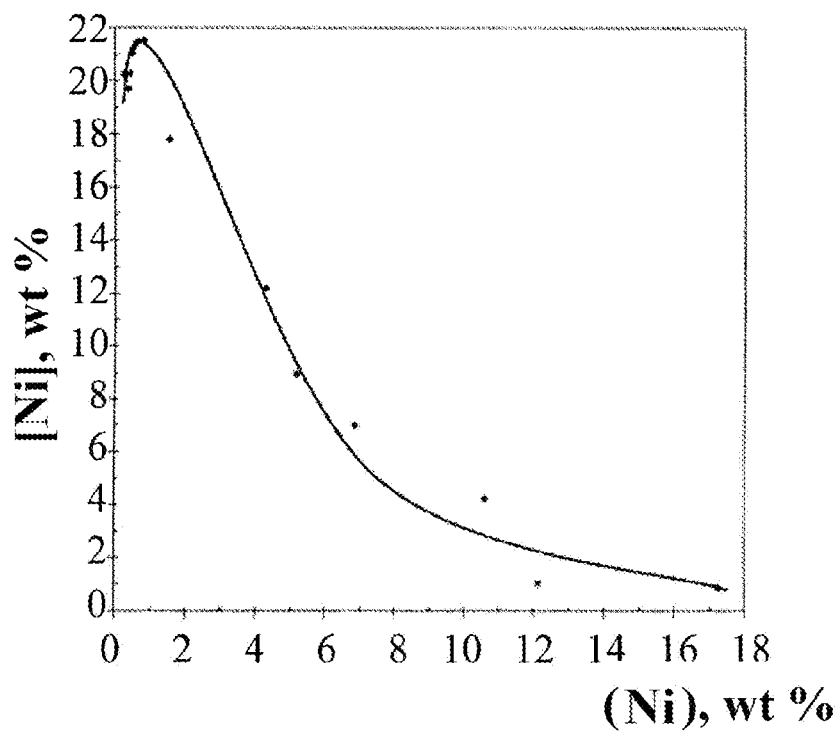

As illustrated in FIGS. 3A and 3B, a decrease of copper content (FIG. 3A) and nickel content (FIG. 3B) in the slag is accompanied by an increase of a nickel content in the metal alloy, reaching a maximum nickel content at a level of 21.5% at copper and nickel concentrations in the slag at levels of 0.8% and 0.4%, respectively. Further decreases in the content of copper and nickel in molten slag to standard values is characterized by a decrease of nickel content in metal alloy, being associated with a start of active iron recovery and transfer of iron to the metal alloy. This will be described hereinbelow in greater detail.

As the proposed new method of continuously processing nickel-containing copper sulphide materials assumes simultaneous production of, on the one hand, an alloy with a certain ratio of copper and nickel and a certain standard content of iron, and on the other hand, a waste slag, it is necessary to choose optimum technological parameters in realizing the implementation of the proposed new method.

Figure 4:
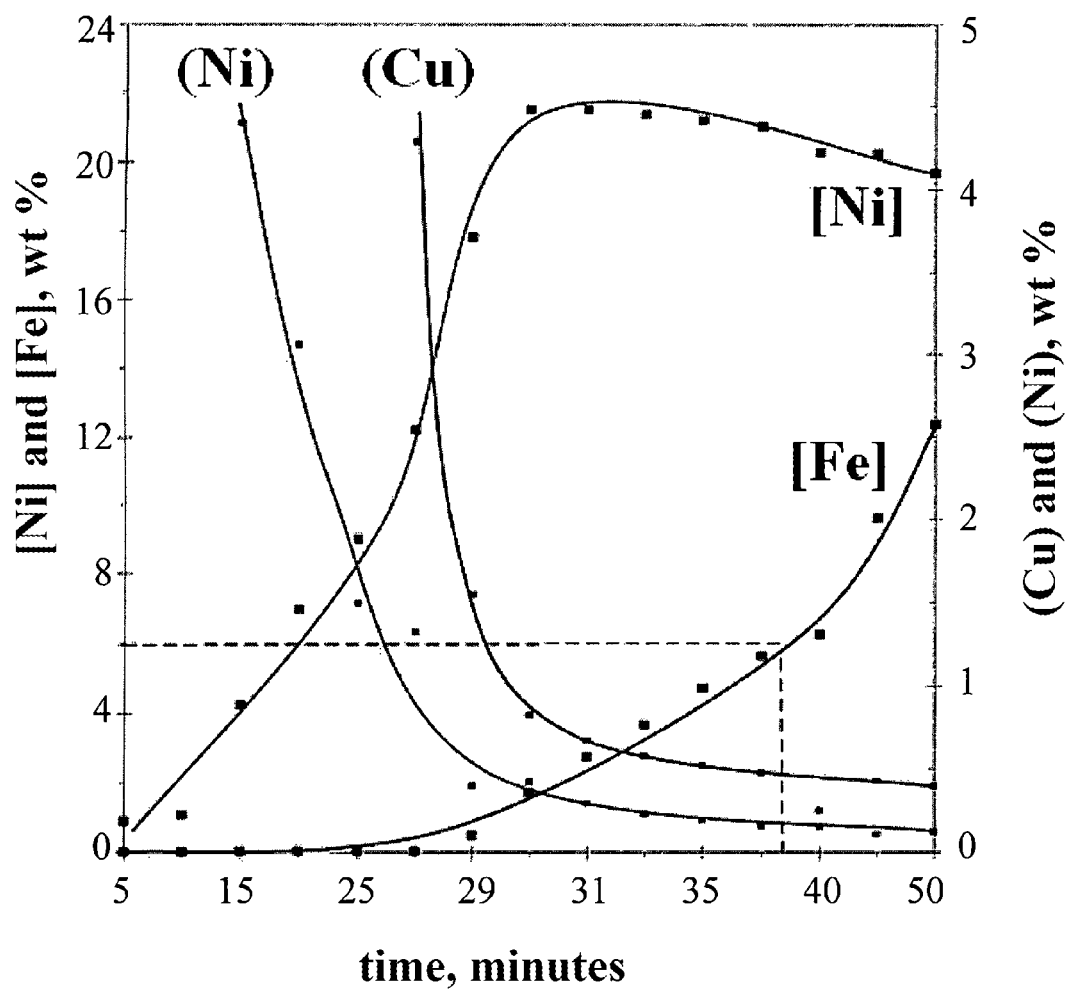
FIG. 4 is a graph illustrating changes in contents of nickel and copper in the copper-nickel metal alloy versus the time of scavenging the molten slag using a reduction gas mixture.

Accordingly, the dynamics of the changes in the compositions of the slag and the copper-nickel alloy should be considered during scavenging using a reduction gas mixture (FIG. 4).

As illustrated in FIG. 4, the changes in the contents of nickel and iron in the metal alloy depend on the time of scavenging the molten slag using the reduction gas mixture. FIG. 4 also illustrates the changes in the contents of copper and nickel in the slag depending on time of scavenging the molten slag using the reduction gas mixture.

It is important to emphasize in FIG. 4, a correlation between the contents of copper and nickel in waste slag and the contents of nickel and iron in the metal alloy, produced as a result of the reduction. There is a significant decrease in the concentrations of both copper and nickel in the slag during active nickel reduction from $5^{th}$ to $30^{th}$ minutes of scavenging, but residual contents of copper and nickel are still rather high (Cu—0.8%; Ni—0.4%), and the resulting slag cannot be considered a waste slag.

Only when active iron reduction starts, does it become possible to decrease the concentrations of copper and nickel in the slag to spoil standards.

Accordingly, on the one hand, in order to obtain a standard iron content in the copper-nickel alloy, particularly, in 'Melchior' (Fe≤0.5%), it is necessary to strive for a minimal degree of iron reduction from the slag during the depletion process.

On the other hand, deep reduction to the contents of copper and nickel in the slag is only possible when producing a copper-nickel alloy with an iron concentration of 5% or more, requiring additional expenditures at an additional stage of refining to produce trademark copper-nickel alloys. In this regard, it is recommended to conduct the depletion process until the iron concentration in the copper-nickel alloy reaches ~6%. In this case, a waste slag with the following composition will be obtained, wt. %: Cu—0.45; Ni—0.17; Fe—30.3; $SiO_2$—37.5; CaO—16.2; $Al_2O_3$—5; MgO—1. A composition of copper-nickel alloy will be as follows, wt. %: Cu—73.2; Ni—20.5; Fe—6.1.

In order to produce commercial products from this alloy, for instance in a form of 'Melchior' alloy, it is necessary to carry out the aforementioned stage of refining, with which iron content in the copper-nickel alloy can be decreased to standard values. The ratio of Cu:Ni in the resulting refined metal alloy will be in range of 4:1-5:1, matching a composition of commercial products. The slag, formed during the oxidative refining process, the base of which are iron oxides, is supplied to a continuous conversion complex, namely to an oxidative stage of the process at the Vanuykov conversion furnace 1. It is possible to produce other types of products, the composition of which is determined for conditions of Russia by the State standard. A specific feature of the developed method, as indicated above, is fact that precious, platinum group metals, presented in the raw material, are almost completely transferred into blister copper at the converting stage, and production of new types of products will not cause additional losses of these metals.

The developed method has a significant advantage—the possibility of producing new commercial products according to a shorter technological scheme, which in general substantially reduces a metallurgical plant's expenses for the production of the commercial products.

TABLE 1

| No exp. | Duration of scavenging, min | Content in alloy, wt % | | | Content in slag, wt % | | | | | | |
|---|---|---|---|---|---|---|---|---|---|---|---|
| | | Cu | Ni | Fe | Ni | Cu | Fe$_{general}$ | SiO$_2$ | CaO | Al$_2$O$_3$ | MgO |
| 1 | 5 | 98.97 | 0.89 | 0.01 | 5.11 | 17.26 | 23.0 | 27.1 | 11.7 | 3.6 | 0.82 |
| 2 | 10 | 98.90 | 1.05 | 0.01 | 5.09 | 12.12 | 24.8 | 28.9 | 12.5 | 3.9 | 0.88 |
| 3 | 15 | 95.62 | 4.24 | 0.02 | 4.40 | 10.60 | 25.4 | 29.6 | 12.8 | 4.0 | 0.90 |
| 4 | 21 | 92.85 | 7.00 | 0.03 | 3.06 | 6.85 | 26.9 | 31.3 | 13.5 | 4.2 | 0.95 |
| 5 | 25 | 90.87 | 8.99 | 0.04 | 1.49 | 5.19 | 27.5 | 32.1 | 13.8 | 4.3 | 0.97 |
| 6 | 27 | 87.70 | 12.18 | 0.05 | 1.32 | 4.29 | 28.4 | 33.1 | 14.3 | 4.4 | 1.01 |
| 7 | 29 | 80.46 | 17.79 | 0.49 | 0.40 | 1.54 | 30.5 | 38.7 | 15.4 | 4.7 | 1.09 |
| 8 | 30 | 76.72 | 21.50 | 1.72 | 0.42 | 0.82 | 30.9 | 36.4 | 15.8 | 4.9 | 1.11 |
| 9 | 31 | 75.68 | 21.49 | 2.73 | 0.29 | 0.67 | 30.8 | 36.9 | 15.9 | 4.9 | 1.12 |
| 10 | 32 | 74.93 | 21.37 | 3.68 | 0.23 | 0.58 | 30.7 | 37.2 | 16.0 | 5.1 | 1.13 |
| 11 | 35 | 74.06 | 21.20 | 4.72 | 0.19 | 0.52 | 30.5 | 37.4 | 16.1 | 4.9 | 1.14 |
| 12 | 37 | 73.30 | 21.02 | 5.66 | 0.16 | 0.48 | 30.3 | 37.6 | 16.2 | 5.3 | 1.14 |
| 13 | 40 | 72.82 | 20.26 | 6.27 | 0.15 | 0.25 | 30.2 | 37.7 | 16.3 | 5.4 | 1.21 |
| 14 | 45 | 70.03 | 20.24 | 9.61 | 0.11 | 0.43 | 29.4 | 38.4 | 16.5 | 5.3 | 1.18 |
| 15 | 50 | 67.95 | 19.67 | 12.37 | 0.09 | 0.40 | 28.72 | 39.1 | 16.3 | 5.6 | 1.23 |

The invention claimed is:

1. A method of continuously processing nickel-containing copper sulphide materials, the method comprising:

oxidizing smelting of a dry nickel-containing copper sulphide material along with SiO$_2$ and CaO-containing fluxes and coal at a specific oxygen consumption in a range of 150-240 Nm$^3$ per ton of the dry nickel-containing copper sulphide material in a conversion furnace for conversion to produce blister copper, gases with a concentration of SO$_2$, and a first slag with a sum of iron, nickel, and cobalt that is not more than 30 wt. %, wherein the first slag contains SiO$_2$:CaO in a concentration ratio of 0.4:1 to 3:1;

depleting the first slag by reduction in a separate reduction furnace, using a mixture of an oxygen-containing gas and a hydrocarbon fuel at an oxygen consumption coefficient ($\alpha$) in a range from 0.5 to 0.9, while supplying coal in an amount of up to 15% of weight of the first slag produced by the oxidizing smelting, wherein $$\alpha = \frac{V_{O_2} \cdot \% O_2 + V_{air} \cdot 0.21}{Q_{CxHy} \cdot K_{CxHy}},$$

wherein $V_{O_2}$ is an oxygen consumption in the reduction furnace, Nm$^3$/hr., % O$_2$ is a volume fraction of oxygen in the oxygen-containing gas, $V_{air}$ is an airflow to a recovery zone of the reduction furnace, Nm$^3$/hr., $Q_{CxHy}$ is a consumption of the hydrocarbon fuel, Nm$^3$/hr., and $K_{CxHy}$ is a coefficient characterizing complete combustion of the hydrocarbon fuel; and scavenging molten slag within 17-35 minutes from start of the depleting the first slag, in order to produce a second slag and a copper-nickel alloy.

2. The method of claim 1, wherein the second slag comprises less than or equal to 3.06 wt. % of nickel and less than or equal to 6.85 wt. % of copper from twenty-first minute of scavenging.

* * * * *